3,229,783
WHEEL SUSPENSION GUIDE ARM CONSTRUCTION
Alf John Müller, Stuttgart-Bad Cannstatt, Germany, assignor to Daimler-Benz Aktiengesellschaft, Stuttgart-Unterturkheim, Germany
Filed Nov. 27, 1963, Ser. No. 329,336
Claims priority, application Germany, Dec. 1, 1962, D 40,421
8 Claims. (Cl. 180—73)

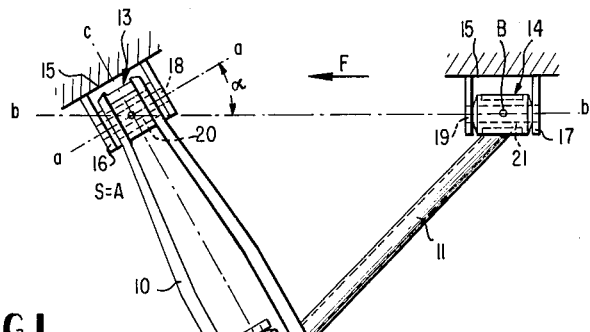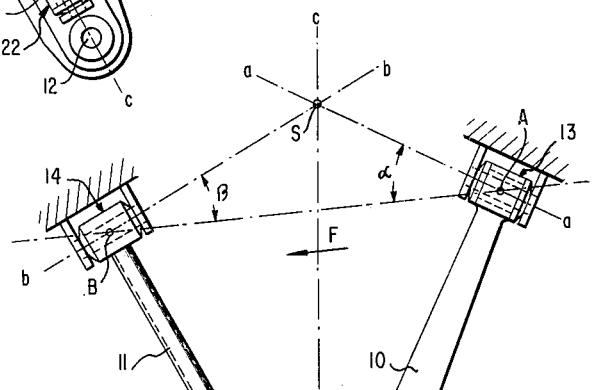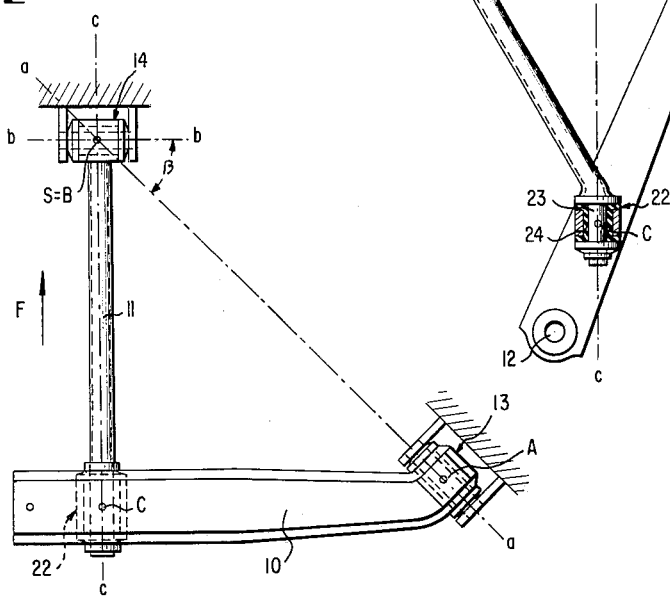

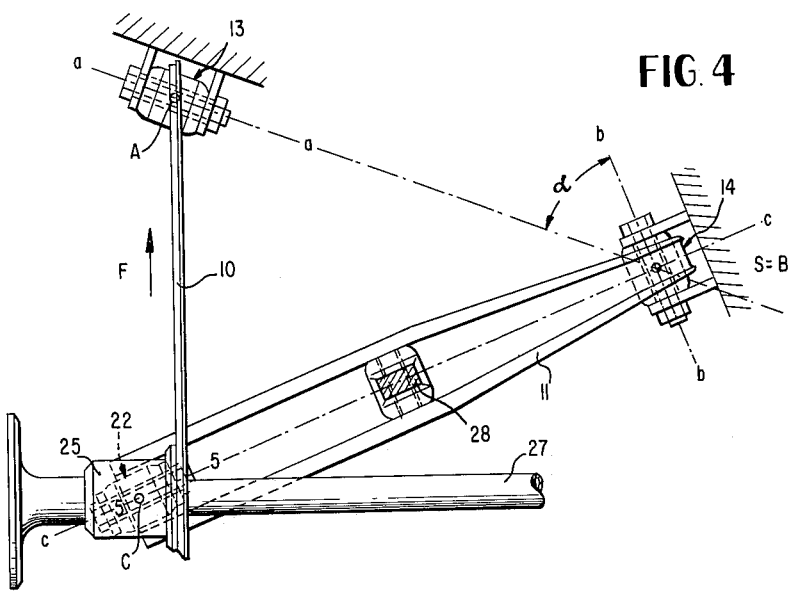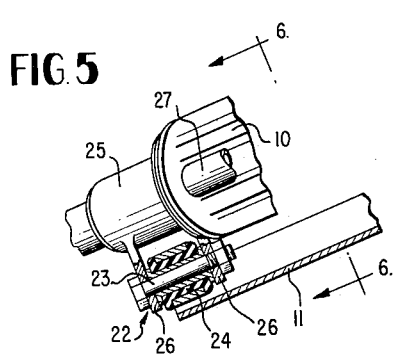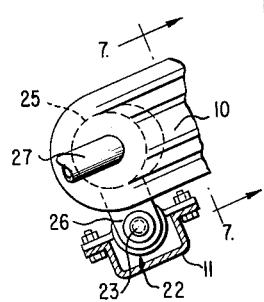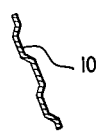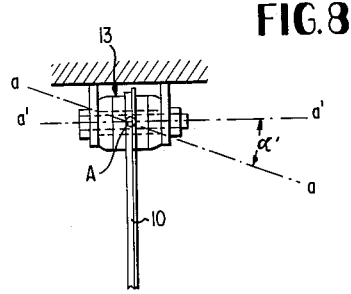

The present invention relates to a guide arm structure for wheels, especially of motor vehicles, which in the manner of a triangular type of construction, consists of two arms which are operatively connected with the vehicle superstructure by way of joints having non-coaxial joint axes by the interposition of elastic elements. Since during spring deflections of the wheels, the arms describe different swinging arcs, the elastic elements in the bearings are more or less stressed whereby the softness of the rubber or of the corresponding material determines the limit for the permissive extent of crossing of the guide arms.

The present invention aims, above all, to eliminate in a far-reaching manner the disadvantages residing in the crossing of the guide arms, and essentially consists in that the two guide arms are connected with one another by means of a joint, the joint axis of which extends through a point in which intersect or approximately intersect the joint axes of the joints connecting the two guide arms with the vehicle superstructure.

It is possible, by the use of the present invention, to select the crossing or transposition of the guide arms, that is, the angles formed by the axes of the bearing joints with a straight line connecting the center points of both bearing joints, relatively very large, without exceeding the permissive wedging or jamming in the rubber elements, especially rubber sleeves or bushings. Above all, the advantage results therefrom that the rubber bearings may be located and arranged in such a manner as are most favorable for the radial absorption of the forces, and that in particular simple bearings without collars may also be utilized for the axial forces as well as simple guide parts without having to take into consideration with the design and shaping of these parts the position of the axis of rotation of the guide arm structure. The guide parts may be constructed, for example, symmetrically so that they may be utilized interchangeably for the left side as well as the right-hand side of the vehicle. These parts may be manufactured of simple pressed or folded parts or of tubular elements or pipes, especially also in such a manner that they are loaded and stressed principally in compression and tension and not in bending. A larger support base also becomes possible thereby so that the occurring forces may be reduced. By reason of the favorable force distribution, a spring engaging at one of the guide arms may be located within a plane, without regard to the axis of rotation of the guide member, which is most favorable from a constructional point of view. By reason of the jointed connection of the guide arms, the sensitivity to tolerances is also considerably decreased as especially also frame tolerances and inaccuracies can be compensated without stressing.

A further advantage of the present invention resides in the fact that by reason of the interposition of elastic elements between the guide arms and the vehicle superstructure or between the guide arms themselves, the noise insulation is considerably improved. Particularly the rolling-off noises at the wheel may be considerably reduced, particularly when that guide arm which has to absorb primarily the forces acting in the vehicle longitudinal direction is connected elastically to the guide arm carrying the wheel so that an additional elastic connection is interposed between the wheel and such guide arm.

A further advantage of the present invention resides in that by subdividing the guide member into two pivotally connected parts, it is possible to support the vehicle spring on the guide part or guide arm serving for the transverse guidance so that the rubber bearings of the guide arm assuming the longitudinal support are not prestressed by spring forces and thereby rendered more hard or stiff. This produces an improved shock and noise insulation as well as a softer rolling action of the axle.

The additional joint between the two guide arms further permits to adjust in a simple manner, for example, by means of an eccentric, the steering pin of the wheel, that is, the positive or negative caster and possibly also the camber of the wheel.

The joint axes of the bearing joints connecting the guide arms with the vehicle superstructure may be so arranged and disposed that they intersect or nearly intersect, for example, also only cross one another in a point outside one of the two bearing joints or within one of the bearing joints. Depending on the position of this point, the axes of the joints connecting the guide arms with one another and the rubber bushings or the like provided therein have to be arranged accordingly.

Possibly the joint axis of one of the joints may extend at an angle to a line connecting the center point of the joint and the point of intersection of the joint axes of the two other joints, if the guide arm connected by the first-mentioned joint with the vehicle superstructure is itself constructed so as to be elastic in torsion and preferably also elastic in flexure or bending. The guide member can under certain circumstances be made more simple from a constructive point of view in that the joint axis is disposed perpendicular to the direction of the guide arm constructed, for example, rectilinearly. Furthermore, the forces transmitted by the guide arm may be conducted more favorably to the joint pins and/or to the vehicle superstructure by means of interposed rubber elements.

Accordingly, it is an object of the present invention to provide the wheel guide arm construction of the type described hereinabove which avoids in a simple and operationally reliable manner the disadvantages encountered with the prior art construction, particularly as regards the limitations of the angular disposition of the guide arms.

Another object of the present invention resides in the provision of a guide arm structure consisting of two angularly disposed guide arms which is so constructed and arranged as to permit the use of a relatively large angle subtended between the axes of the bearing joints with a straight line connecting the center points of the bearing joints, without exceeding permissive stressing, wedging and loading within the elastic bearing elements, especially within the rubber bushings provided in the joints.

A still further object of the present invention resides in the provision of a guide arm assembly of the type described hereinabove in which the elastic bearings utilized for the connection with the vehicle superstructure may be so located as is most favorable for the radial absorption of the forces without involving complicated and costly structures in the elastic bearing elements.

Still a further object of the present invention resides in the provision of a guide arm structure consisting of two guide arms connected with one another which permits the use of simple guide arm parts that may be constructed without regard to the location and arrangement of the axis of rotation thereof.

Another object of the present invention resides in the provision of simple guide arm structures for the wheel suspensions of motor vehicles of which the individual guide parts may not only be manufactured in a simple and relatively inexpensive manner, but which also enable interchangeability of the parts for both sides of the vehicle.

A still further object of the present invention resides in the provision of a guide arm assembly in which the guide arm parts are loaded primarily in compression and tension while eliminating any bending loads on these parts.

A further object of the present invention resides in the provision of a wheel guide member for wheel suspensions in motor vehicles which permits an effective reduction of the occurring forces by an increase in the support base, while at the same time enabling a structurally most favorable lay-out of the spring system and shock absorber parts of the suspensions without regard to the swinging axis of the guide structure.

Still another object of the present invention resides in the provision of a wheel guide structure consisting of two guide arms connected with one another which permits within certain limits, a compensation for inaccuracies in the manufacture and assembly of the frame and/or body.

A further object of the present invention resides in the provision of a guide arm structure for wheel suspensions which permits improved insulation against noises and shocks while at the same time assuring a soft absorption of road shocks, particularly longitudinally directed road shocks and forces.

Still a further object of the present invention resides in the provision of a wheel suspension utilizing a two-arm guide structure which permits a simple adjustment of the caster and/or camber angle of the wheel suspension by the adjustment of the connection of the two guide arms with one another.

These and other objects, features, and advantages of the present invention will become more obvious from the following description when taken in connection with the accompanying drawing which shows, for purposes of illustration only, several embodiments in accordance with the present invention, and wherein—

FIGURE 1 is a plan view on a first embodiment of a wheel guide arm structure in accordance with the present invention, especially for a front axle in which the axes of the bearing joints intersect within the bearing joint of that guide arm that serves for the suspension of the wheel;

FIGURE 2 is a plan view on a modified embodiment of a wheel guide arm structure in accordance with the present invention, especially for a rear axle in which the axes of the bearing joints intersect within the bearing joint of that guide arm which itself does not serve directly for the suspension of the wheel;

FIGURE 3 is a plan view of a still further modified embodiment of a wheel guide arm structure in accordance with the present invention in which the axes of the bearing joints intersect outside of one of the two bearing joints;

FIGURE 4 is a plan view of still another modified embodiment of a wheel guide arm structure in accordance with the present invention, especially for a rear axle, with a torsionally elastic guide arm carrying the vehicle wheel;

FIGURE 5 is a partial cross-sectional view, on an enlarged scale, taken along line 5—5 of FIGURE 4;

FIGURE 6 is a partial cross-sectional view taken along line 6—6 of FIGURE 5;

FIGURE 7 is a partial cross-sectional view taken along line 7—7 of FIGURE 6, and FIGURE 8 is a partial plan view of a modified embodiment of a wheel guide structure similar to that of FIGURE 4.

Referring now to the drawing wherein like reference numerals are used throughout the various views to designate like parts, and more particularly to FIGURE 1, the guide arm carrying the wheel is designated therein by reference numeral 10 while the additional guide arm supporting the guide arm 10 is designated therein by reference numeral 11. The wheel (not shown) is connected with the first-mentioned guide arm 10, for example, by means of a steering pin, in a ball joint 12 or the like. The steering pin (not shown) may be guided in a manner, known per se, by a further guide arm structure in a parallelogram-like manner whereby the second guide member may be constructed, in principle, in a similar manner with the use of two guide arms, corresponding to the guide arms 10 and 11 illustrated in FIGURE 1. The illustrated embodiment is intended especially for a front wheel suspension-approximately with a driivng direction indicated by arrow F.

The main guide arm 10 directly carrying and guiding the wheel is connected with the vehicle superstructure schematically indicated, for example, at 15, by means of a bearing joint generally designated by reference numeral 13 and the guide arm 11 serving for the support by a bearing joint generally designated by reference numeral 14 in that the guide arms are supported in bearings 16 and 17 by means of a bearing bolt 18 and 19 by the interposition of a rubber bushing 20 and 21, respectively. The vehicle superstructure 15 may be constituted, for instance, by a frame, a body portion of a self-supporting type body construction or the like. Both guide arms 10 and 11 form a jointed triangular guide member of which the joint centerpoints are designated by reference characters A, B, and C, respectively.

As may be seen from FIGURE 1, the axes $a$—$a$ and $b$—$b$ of the bearings 13 and 14 are arranged inclined to one another at an angle $\alpha$ whereby the two axes intersect in the static condition in a point S which coincides in the construction of FIGURE 1 with the centerpoint A of the bearing 13.

According to the present invention, the two guide arms 10 and 11 are connected with one another by a connecting joint generally designated by reference numeral 22 which is also provided like the bearing joints 13 and 14, with a joint bolt 23 having a rubber bushing 24 placed or slipped over the same. The axis $c$—$c$ of the joint 22 is thereby so arranged that in the static condition it extends through the point of intersection S or A of the bearing joint axes $a$—$a$ and $b$—$b$. Owing to this arrangement, the loads and stresses of the rubber bushings 20, 21 and 24 interposed in the joints 13, 14, and 22, respectively, are reduced to a minimum. The rubber bushings may—in case of loads on the guide arms only in tension or compression—be constructed possibly also as simple rubber bushings or sleeves without collar. The guide arm 10 consists, for example, of a pressed-out part, while the guide arm 11 consists of a tubular member, pipe or rod, whereby the bearing eyes of the joints 14 and 22 are welded to the ends of the tubular member, pipe, or rod.

The embodiment according to FIGURE 2 which is intended primarily for rar axles with a driving direction approximately in the direction of arrow F differs from the embodiment of FIGURE 1 essentially in that the bearing joint axes $a$—$a$ and $b$—$b$ intersect within the bearing joint 14 of the supporting guide arm 11 under an angle $\beta$, while the point of intersection S coincides with the centerpoint B of this bearing joint 14. Accordingly, the connecting joint 22 between the guide arms 10 and 11 is so arranged that the axis $c$—$c$ in the static condition extends through the centerpoint B of the bearing joint 14, that is, in contrast to the construction according to FIGURE 1, perpendicularly or approximately perpendicularly to the longitudinal direction of the guide arm 10. Otherwise, what was said in connection with the embodiment of FIGURE 1 applies equally to the embodiment of FIGURE 2.

In the embodiment according to FIGURE 3, the axes $a$—$a$ and $b$—$b$ of the bearing joints 13 and 14 form a crossing angle $\alpha$ and $\beta$, respectively, with respect to the side AB of the guide triangle ABC. The point S is disposed, for example, within a sector formed by lines CA and CB in such a manner that the straight line connecting C and S forms an angle bisecting line between the sides CA and CB of the guide triangle, that is, essentially an angle bisecting line between the two guide arms 10 and 11. Accordingly, the connecting joint 22 between the guide arms 10 and 11 is so arranged that the axis c—c of the joint bolt 23 and/or of the rubber bushing 24 of the joint in the static condition extends through the point S, therefore, approximately in the direction of the angle bisecting line between the guide arms.

Otherwise, what was said in connection with the previous embodiments equally applies to the embodiment of FIGURE 3.

In the embodiment according to FIGURES 4 to 7, which again is intended primarily for a rear axle—with a driving direction assumed in the direction of arrow F—the guide arm 10 carrying the wheel bearing 25 and rigidly connected therewith is constructed elastic in torsion and bending, for example, in the form of a leaf spring with undulated cross section (FIG. 7), whereas the guide arm 11 consists of a pressed-out part having U-shaped cross section (FIG. 6). The guide arm 11 carries the joint 22 with the rubber bushing 24 between the side walls of the U-shaped cross section, into which extend the bearing arms 26 arranged at the wheel bearing 25 for the joint bolt 23. The joints 13, 14 and 22 of the triangular guide member ABC are so arranged in that case that the axes a—a, b—b, and c—c thereof in the static condition intersect in a common point of intersection S-B.

The drive of the wheel takes place by means of a drive shaft 27 nonpivotally supported within a wheel bearing 25, for example, from an axle gear (not shown) that possibly swings together with the shaft 27 and the wheel. The connection of the wheel spring and/or of a shock absorber at the guide arm 11 is indicated at 28. Preferably, this connection also takes place by the interposition of rubber cushions.

In all of the embodiments, the rubber bushings of the different joints may be constructed each with a collar (as illustrated) or, especially in case of the exclusively radial loads, also without collars, but should exhibit a universal elasticity, that is, in all directions.

Instead of intersecting in one point, the joint axes a—a, b—b, and c—c may also be so arranged that in the static condition they intersect in different points or only cross one another without intersection, if the points of intersection or cross-over points (that is, the end points of the shortest connecting line between the axes) do not have an excessively large distance from one another.

Thus, for example, FIGURE 8 illustrates a modified embodiment of FIGURE 4 in which the joint axis a'—a' of the joint 13' forms an angle α' with respect to the axis a—a. Such a deviation is possible especially also by the torsionally elastic construction of the guide arm 10 which absorbs the additional deformation that would otherwise occur in the rubber cushions of the joint by reason of the deviations of the joint axis from the straight line a—a. The advantage of this construction consists above all in that the joint axis a'—a' extends perpendicularly to the longitudinal direction of the rectilinearly constructed guide arm 10 which enables a more simple guide member construction and a more favorable force-transmission from the arm 10 to the bearings of the joints 13 at the vehicle superstructure.

While I have shown and described several embodiments in accordance with the present invention, it is understood that the same is not limited thereto, but is susceptable of numerous changes and modifications as known to a person skilled in the art, and I therefore do not wish to be limited to the details shown and described herein but intend to cover all such changes and modifications as are encompassed by the scope of the appended claims.

I claim:
1. A guide arm structure for wheels, especially of motor vehicles, comprising:
   first guide arm means,
   second guide arm means,
   first elastic joint means having a joint axis pivotally connecting said first guide arm means to said second guide arm means at a point spaced from the end thereof,
   and further joint means having joint axes and located near the free end of said first and second guide arm means to enable pivotal connection thereof with the vehicle superstructure,
   the joint axis of said first joint means in the static condition extending through a point in which approximately intersect the joint axes of said further joint means,
   said first joint means being constructed as an elastic joint, the axis of which extends in the static condition along said second guide arm means approximately through the point of intersection of the axes of said further joint means,
   said first joint means and said further joint means being in the form of pin joints having cylindrical resilient bushings.
2. A guide arm structure for wheels, especially of motor vehicles, comprising:
   first guide arm means,
   second guide arm means,
   first joint means having a joint axis pivotally connecting with one another said first and second guide arm means,
   and further joint means having joint axes and located near the free end of said first and second guide arm means to enable pivotal connection thereof with the vehicle superstructure,
   the joint axis of said first joint means in the static condition extending through a point in which approximately intersect the joint axes of said further joint means,
   the joint axes of the further joint means in the static condition intersecting in a point which is disposed approximately on the angle bi-secting line between the two guide arm means.
3. A guide arm structure for wheels, especially of motor vehicles, comprising:
   first guide arm means,
   second guide arm means,
   first elastic joint means having a joint axis pivotally connecting with one another said first and second guide arm means,
   and further joint means having joint axes and located near the free end of said first and second guide arm means to enable pivotal connection thereof with the vehicle superstructure,
   the joint axis of said first joint means in the static condition extending through a point in which approximately intersect the joint axes of said further joint means,
   said first joint means being constructed as an elastic joint the axis of which extends in the static condition approximately through the point of intersection of the axes of the further joint means,
   the joint axes of the further joint means in the static condition intersecting in a point which is disposed approximately on the angle bi-secting line between the two guide arm means.
4. A guide arm structure for wheels, especially of motor vehicles, comprising:
   first guide arm means,
   second guide arm means,
   first elastic joint means having a joint axis pivotally connecting with one another said first and second guide arm means,
   and further joint means having joint axes and located near the free end of said first and second guide arm means to enable pivotal connection thereof with the vehicle superstructure, the joint axis of said first joint means in the static condition extending through a point in which approximately intersect the joint axes of said further joint means, said first joint means being constructed as elastic joint the axis of which in the static condition extends approximately through the point of intersection of the axes of the further joint means, the joint axes of the further joint means in the static condition intersecting in a point which is disposed approximately or the angle bi-secting line between the two guide arm means, the joint axis of one of said further joint means extending substantially perpendicularly to the corresponding guide arm means.

5. A guide arm structure for wheels, especially of motor vehicles, comprising:
first guide arm means,
second guide arm means,
first joint means pivotally connecting with one another said first and second guide arm means,
and further joint means near the free end of a respective guide arm means to enable pivotal connection thereof with the vehicle superstructure,
the joint axis of said first joint means in the static condition extending through a point in which approximately intersect the joint axes of said further joint means,
one of said guide arm means being constructed to be elastic in torsion and in bending, said last-mentioned guide arm means being constructed as leaf spring with undulated cross section.

6. A guide arm structure for wheels, especially of motor vehicles, comprising:
first guide arm means,
second guide arm means,
first joint means pivotally connecting with one another said first and second guide arm means,
and further elastic joint means near the free end of a respective guide arm means to enable pivotal connection thereof with the vehicle superstructure,
the joint axis of said first joint means in the static condition extending through a point in which approximately intersect the joint axes of said further joint means,
said first joint means being constructed as elastic joint, the axis of which in the static condition extends approximately through the point of intersection of the joint axes of the further joint means,
one of said guide arm means being constructed to be elastic in torsion and in bending, and carrying the wheel bearing, said last-mentioned guide arm means being constructed as leaf spring with undulated cross section,
and the other of said guide arm means consisting of a stamped part of approximately U-shaped cross section and accommodating between the U-shaped leg portions thereof the first joint means.

7. A guide arm structure for wheels, especially of motor vehicles, comprising:
first guide arm means,
second guide arm means,
first joint means pivotally connecting with one another said first and second guide arm means,
and further joint means near the free end of a respective guide arm means to enable pivotal connection thereof with the vehicle superstructure,
the joint axis of said first joint means in the static condition extending through a point in which approximately intersect the joint axes of said further joint means,
one of said guide arm means being constructed to be elastic in torsion and in bending, said last-mentioned guide arm means being constructed as leaf spring with undulated cross section,
and the other of said guide arm means consisting of a stamped part of approximately U-shaped cross section and accommodating between the U-shaped cross section and accommodating between the U-shaped leg portions thereof the first joint means.

8. A guide arm construction for wheels, especially of motor vehicles, comprising:
first guide arm means,
second guide arm means,
first joint means pivotally connecting with one another said first and second guide arm means,
and further joint means near the free end of a respective guide arm means to enable pivotal connection thereof with the vehicle superstructure,
the joint axis of said first joint means in the static condition extending through a point in which intersect approximately the joint axes of said further joint means,
said first joint means being constructed as elastic joint, the axis of which in the static condition extends approximately through the point of intersection of the axes of the further joint means,
only the one guide arm means which is disposed approximately transversely being directly connected with the wheel whereas the other approximately longitudinally directed guide arm means is connected by means of an elastic joint with said one guide arm means,
one of said guide arm means being constructed as leaf spring and carrying the wheel bearings,
the other of said guide arm means consisting of a stamped-out part of approximately U-shaped cross section and accommodating between the U-shaped leg portions thereof the first joint means,
drive means for a respective wheel including axle shaft means non-pivotally supported within said wheel bearing,
and wheel spring and shock absorber means supported at said other guide arm means.

References Cited by the Examiner

UNITED STATES PATENTS

| | | | |
|---|---|---|---|
| 2,988,161 | 6/1961 | Herr | 280—124 X |
| 3,033,587 | 5/1962 | Perish | 280—124 |
| 3,123,348 | 3/1964 | Hildebrandt | 280—124 |

FOREIGN PATENTS 637,892   3/1962   Canada.

BENJAMIN HERSH, *Primary Examiner.*

A. HARRY LEVY, *Examiner.*